Figure 3:
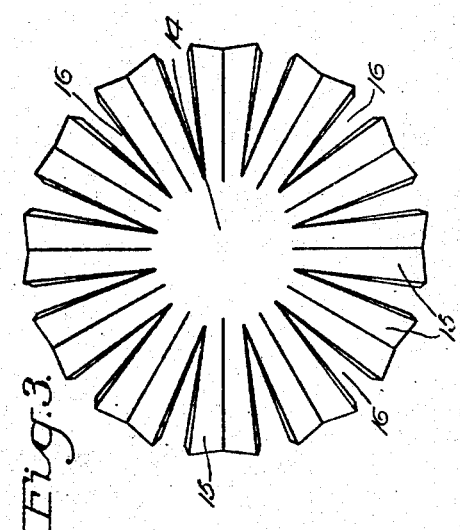

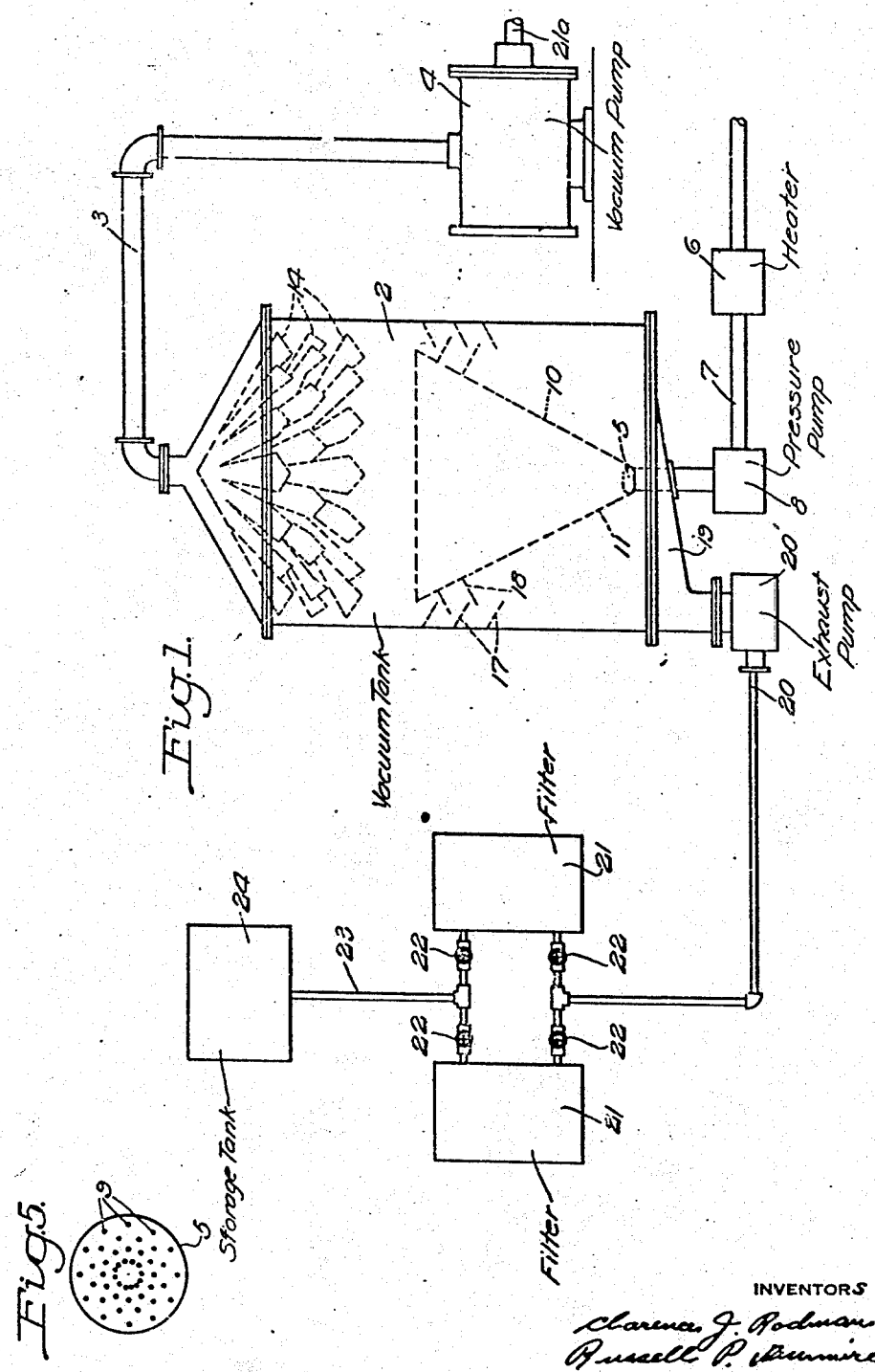

Sept. 22, 1931.  C. J. RODMAN ET AL  1,824,498
PURIFICATION OF LIQUIDS
Filed June 25, 1929   2 Sheets-Sheet 2

INVENTORS
Clarence J. Rodman
Russell P. Dunmire
by Byrnes, Stebbins & Parmelee
Attys.

Patented Sept. 22, 1931

1,824,498

UNITED STATES PATENT OFFICE

CLARENCE J. RODMAN AND RUSSELL P. DUNMIRE, OF ALLIANCE, OHIO, ASSIGNORS TO THE BUCKEYE TWIST DRILL COMPANY, OF ALLIANCE, OHIO, A CORPORATION OF OHIO

PURIFICATION OF LIQUIDS

Application filed June 25, 1929. Serial No. 373,503.

This invention relates to a method of purifying liquids and more particularly to a method of purifying mineral hydrocarbon oils to increase their insulating value in electrical apparatus. It also relates to an oil, the insulating value of which increases upon standing in contact with atmosphere even though moisture is present in the atmosphere.

This application is a continuation in part of our copending application Serial No. 359,301, filed April 30, 1929. According to our present process, we treat non-aqueous liquids such as mineral hydrocarbon oils, to render them anhydrous, free from dissolved gases, moisture and volatile hydrocarbons which result from oxidation of the oil when in use. Although in this specification only the purification of mineral hydrocarbon oils is described in detail, it is to be understood that our process is applicable to the purification of any non-aqueous liquid. In the purification of mineral hydrocarbon oils our invention is applicable both to the preparation of new oils and to the conditioning of oils after use, for example, in oil submerged electrical apparatus.

Mineral hydrocarbon oils are refined for and find a wide application as an insulating medium in oil submerged electrical apparatus because of the dielectric strength characteristics of the oil. The oils are used both as a cooling and insulating medium in transformers, voltage regulators and as an insulating medium in cable joints and the like. When hydrocarbon oils are used for these purposes, they are subjected to oxidation reactions resulting from the combined action of heat absorbed from the electrical apparatus, and the oxygen in the atmosphere which has ready access to the oil. Complex hydrocarbons are chemically altered by such oxidation reactions resulting in the formation of organic acids, volatile hydrocarbons, soap and deposits termed "sludge". When hydrocarbon mineral oils are used in electrical apparatus such as circuit breakers, the arcing action which takes place results in decomposition of the complex hydrocarbons forming elemental carbon, hydrogen, carbon monoxide, carbon dioxide, methane, and hydrocarbon vapors, all of which reduce the dielectric strength of the insulating medium. Concurrently with the decomposition of a portion of the oil, water may be formed due to the combination of hydrogen evolved in the zone of the arc with oxygen dissolved in the oil. These traces of water may be in true solution in the oil and together with the evolved carbon particles of colloidal size contribute to the deterioration of the insulating value of the oil.

Heretofore it has been attempted to remove water and suspensions by gravity, by centrifugal force, and by filtering. These processes, however, have been only partially successful because they failed to remove water of true solution, volatile hydrocarbons and dissolved gases such as oxygen.

In accordance with the present invention we spray the liquid to be purified into a vacuum chamber. The liquid introduced into the vacuum chamber is preferably heated and its pressure is raised to above 60 pounds per square inch before being introduced into the vacuum chamber. The vacuum within the chamber is maintained at as high a vacuum as is practical, preferably from 28 to 30 inches of mercury, as referred to a 30 inch barometer. When the liquid under pressure is introduced into the vacuum chamber the dissolved water and gases are subjected to a sudden pressure jar or shock which causes the water and gases to escape from the liquid. The liquid after having water and gases removed therefrom is pumped through suitable filters and delivered to a storage tank.

Figure 4:
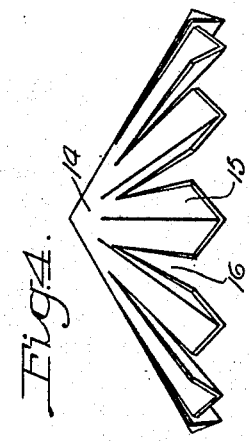
Figure 2:
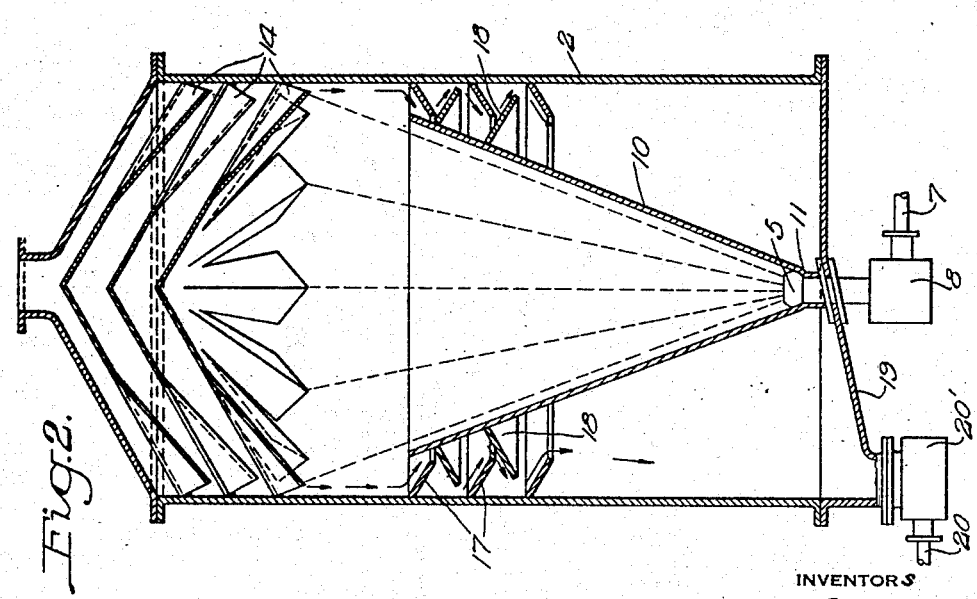

In the accompanying drawings which illustrate the present preferred embodiment of apparatus suitable for carrying out our process, Figure 1 shows in a diagrammatic manner the arrangement of the purifying apparatus, Figure 2 is a vertical section of the vacuum tank, Figure 3 is a plan view of one of the baffles, for collecting and deflecting the liquid, Figure 4 is an elevation of the baffle shown in Figure 3, and Figure 5 is a detail of the spray nozzle.

Referring to the drawings, there is shown a vacuum tank 2 connected by a pipe 3 to a vacuum pump 4 which maintains the vacuum chamber under reduced pressure. The tank 2 has a nozzle 5 arranged in its bottom for spraying the liquid which is to be purified. The liquid is heated in a heater 6 and is supplied to the nozzle 5 through a pipe 7 and a pressure pump 8. The pressure pump raises the pressure of the liquid supplied to the nozzle so that as the liquid is sprayed into the vacuum tank it is subjected to a sudden shock which releases dissolved gases and water therefrom. The nozzle 5 is formed with a series of concentric openings 9 which spray the liquid upwardly in the vacuum tank in a series of concentric cones. The spray is guided in its travel upwardly through the vacuum tank by a conical baffle 10 having its apex 11 extending downwardly and surrounding the nozzle. A series of conical baffles 14 are arranged in the tank above the baffle 10. These baffles are shown in detail in Figs. 3 and 4. They are formed from a circular piece of metal which is slit to form segments 15. Each of these segments is then bent into a trough shape as indicated in Fig. 4. After the segments have been bent to form the troughs, the baffle consists of trough-like segments 15 separated by spaces 16. As shown, three of these conical baffles are arranged one above the other in the vacuum tank. They are arranged so that the segments of the middle baffle are in alinement with the spaces 16 between the segments of the upper and lower baffles. The liquid sprayed from the nozzle 5 impinges upon the series of baffles 14.

Due to the arrangement of the baffles as described, a tortuous path is formed between the segments of adjacent baffles. The liquid impinges upon the segments of the baffles and drops down into and is collected by the segments of the next lower baffle. The liquid flows in the downwardly and outwardly extending troughs and is collected by annular baffles 17 secured to the inside of the vacuum tank. Other baffles 18 connected to the conical baffle 10 cooperates with the baffles 17 to cause the liquid to follow the tortuous path indicated by the arrows in Fig. 2, after which the liquid flows to the bottom of the tank. The bottom 19 of the tank slopes downwardly so as to cause the liquid to collect and be delivered to the pipe 20 by means of an exhaust pump 20'.

As the liquid sprayed from the nozzle 5 impinges against the baffles 14 and is collected thereby as above described, the gases and moisture removed from the liquid by the vacuum flow out of the top of the tank through the pipe 3 and vacuum pump 4 and are exhausted through a pipe 21a.

The provision of the cone 10 prevents the formation of eddy currents within the vacuum tank 2. If the cone were not present, eddy currents might be formed which would cause the spray from the nozzle 5 to be carried to the outlet of the vacuum tank without the liquid first impinging against the baffles 14 and being delivered therefrom to the baffles 17 and 18. The liquid would not be forced to follow a tortuous path between the baffles 17 and 18, and would not be subjected to the action of the vacuum in order to remove the moisture and gases from the liquid. The cone 10 also provides a convenient means for fastening the baffles 18 thereto.

The purified liquid from which the moisture and gases have been removed flows from the vacuum tank through the pump 20' and pipe 20 to one of the filters 21. The filters remove any suspended particles which may have been present in the liquid. In the drawings two filters 21 are shown and the system is provided with valves 22 so that one of the filters may be used while the other is being cleaned. The filtered material flows through a pipe 23 to a storage tank 24.

The optimum conditions for the most efficient purification of oil depends upon the particular oil being treated. The pressure of the oil introduced into the vacuum chamber 2, the temperature of the oil, and the degree of vacuum maintained in the vacuum chamber should be maintained within certain ranges. As a general statement it may be said that the best results are obtained when the vacuum chamber is maintained at as near an absolute vacuum as is possible, and when the pressure and temperature of the oil are maintained as high as is possible without volatizing or injuring the oil before it is sprayed into the vacuum chamber.

In treating a transformer oil in order to purify it and eliminate moisture and gases therefrom, we have found that the oil should be heated to a temperature of from 90 to 160° F., generally from 140 to 160° F., and preferably at a temperature of about 150° F. The pressure to which the oil is raised may vary between 60 and 200 pounds per square inch, generally between 100 and 150 pounds per square inch, and preferably at about 125 pounds per square inch. The degree of vacuum maintained in the vacuum chamber may vary from 28 to 30 inches of mercury, as referred to a 30 inch barometer, but we have found that the best results are obtained when the vacuum is maintained between 29.5 and 29.7 inches of mercury.

We have found that by raising the pressure of the liquid before it enters the vacuum tank, and then introducing it into the tank which is maintained at a very low pressure, we accomplish the removal of water and gases more efficiently than if the liquid were introduced into the vacuum under atmospheric pressure. We find that the sudden drop in pressure gives a jarring or cracking action to the liquid which causes the water and dissolved gases to be expelled therefrom. The apparatus hereinabove described causes the liquid sprayed from the nozzle 5, after having impinged against the conical baffles 14, to follow a tortuous path before it leaves the vacuum tank. In this manner the liquid is subjected to the action of the vacuum for a relatively long time, so that the dissolved gases and water have an opportunity to escape from the oil. The apparatus causes the efficient removal of moisture and gases from oils so as to increase their dielectric properties. The apparatus is of simple construction involving the use of no revolving parts.

We have found that oil purified in accordance with our invention has certain desirable properties which are not present in oil produced by other methods. For example, we have found that oil treated in accordance with our process, after having been allowed to stand in contact with the atmosphere has an increased insulating value. It would ordinarily be expected that if oil were allowed to stand in contact with the atmosphere, particularly moist atmosphere, the insulating value of the oil would be decreased. We have found further that an oil treated in the above described apparatus has a greater insulating value after having stood in contact with the atmosphere, even if the atmosphere is moist, than it had when it was first delivered from the purifying apparatus. A sample of oil was tested soon after it had come from the apparatus. This sample was found to have an insulating value of 35 kilovolts measured at the standard one-tenth inch gap using parallel electrodes one inch in diameter. The oil was allowed to stand in contact with the atmosphere for about three weeks and a second sample was tested under the same conditions. The second sample gave an insulating value of considerably over 40 kilovolts. Oils having insulating values of from about 35 to 60 kilovolts when tested under the above described standard conditions can be produced according to the present invention.

The exact theory which causes oil purified in accordance with our invention to increase in insulating value has not yet been definitely determined. We believe, however, that it is due to the fact that in our purification process certain impurities in the oil which tend to absorb water from the atmosphere are substantially entirely removed from the oil. After oil has been so purified it will not absorb moisture from the atmosphere so as to decrease in insulating value, but will, on the contrary, actually increase in insulating value upon exposure to the atmosphere. The reason for the increase in insulating value may be accounted for by the oil absorbing certain gases without, however, absorbing moisture. Whether or not our theories are correct, we have found that there is an actual increase in the insulating value of oil purified in accordance with our invention, and we do not limit ourselves to the theories which we have advanced to account for the increase in insulating value of the oil.

We have illustrated and described the present preferred embodiment of an apparatus suitable for carrying out our process. We also have described in detail the manner of practicing the process and have advanced certain theories which we now believe account for certain unlooked for phenomena. It is to be understood, however, that the invention may be otherwise embodied or practiced within the scope of the following claims.

We claim:

1. The process of removing moisture and gases from oils, comprising raising the pressure of the oil substantially above atmospheric pressure, spraying it at a temperature below 160° F. into a rarified atmosphere maintained under a high vacuum to release the moisture and gases from the oil, and separating the moisture and gases from the oil.

2. The process of removing moisture and gases from oils, comprising heating the oil to a temperature of from 90 to 160° F. and raising its pressure to substantially above atmospheric pressure to release the moisture and gases from the oil, spraying it into a rarified atmosphere maintained substantially below atmospheric pressure, and separating the moisture and gases from the oil.

3. The process of removing moisture and gases from oil, comprising heating the oil and raising its pressure to at least 60 pounds per square inch, spraying it into an atmosphere maintained under a vacuum of from 28 to 30 inches of mercury as referred to a 30 inch barometer to release the moisture and gases from the oil, and separating the moisture and gases from the oil.

4. The process of removing moisture and gases from oil, comprising spraying the oil at a pressure of from 60 to 200 pounds per square inch and at a temperature of from 90 to 160° F. into an atmosphere maintained under a vacuum of from 28 to 30 inches of mercury as referred to a 30 inch barometer to release moisture and gases from the oil, and separating the moisture and gases from the oil.

5. The process of removing moisture and gases from oil, comprising spraying the oil at a pressure of from 100 to 150 pounds per square inch and at a temperature of from 140 to 160° F. into an atmosphere maintained under a vacuum of from 29.5 to 29.7 inches of mercury as referred to a 30 inch barometer to release the moisture and gases from the oil, and separating the moisture and gases from the oil.

6. The process of removing moisture and gases from oil, comprising spraying the oil at a pressure of about 125 pounds per square inch and at a temperature of about 150° F. into an atmosphere maintained under a vacuum of from 29.5 to 29.7 inches of mercury as referred to a 30 inch barometer to release the moisture and gases from the oil, and separating the moisture and gases from the oil.

7. In the process of removing moisture and gases from oil, the steps comprising spraying oil under super-atmospheric pressure upwardly in a tank maintained at sub-atmospheric pressure to release the moisture and gases from the oil, collecting the sprayed oil and separating the oil and gases therefrom, and flowing the oil in a tortuous path toward the bottom of the tank while exposed to the reduced pressure in the tank.

8. The process of removing high vapor pressure fluids from a relatively low vapor pressure liquid, comprising spraying the liquid under super atmospheric pressure into a vacuum of 28–30 inches of mercury against baffles to release the high vapor pressure fluids from the low vapor pressure liquid against baffles, removing the fluids of high vapor pressure, and collecting the liquid from which the high vapor pressure liquids have been removed.

9. The process of removing light hydrocarbons from a liquid of relatively heavy hydrocarbons, comprising spraying the liquid under super atmospheric pressure into a vacuum of 28–30 inches of mercury against baffles to release the light hydrocarbons from the heavy hydrocarbons, removing the light hydrocarbons, and collecting the liquid from which the light hydrocarbons have been removed.

10. The process of removing moisture and volatiles from oil, comprising spraying the oil upwardly under a vacuum of 28–30 inches of mercury against baffles arranged in staggered relation so as to arrest the oil and cause the moisture and volatiles to be separated therefrom, removing the moisture and volatiles, and collecting the oil.

In testimony whereof we have hereunto set our hands.

CLARENCE J. RODMAN.
RUSSELL P. DUNMIRE.